United States Patent
Cowden et al.

(10) Patent No.: US 8,447,794 B2
(45) Date of Patent: May 21, 2013

(54) METHODS, SYSTEMS, AND COMPUTER PROGRAM PRODUCTS FOR VIEWING FILE INFORMATION

(75) Inventors: Keith B. Cowden, Houston, TX (US); Kevin L. Miner, Apopka, FL (US)

(73) Assignee: International Business Machines Corporation, Armonk, NY (US)

( * ) Notice: Subject to any disclaimer, the term of this patent is extended or adjusted under 35 U.S.C. 154(b) by 366 days.

(21) Appl. No.: 12/115,862

(22) Filed: May 6, 2008

(65) Prior Publication Data
US 2009/0281983 A1 Nov. 12, 2009

(51) Int. Cl.
*G06F 17/30* (2006.01)

(52) U.S. Cl.
USPC .................................................. 707/822

(58) Field of Classification Search
USPC ........................................ 707/202–205, 822
See application file for complete search history.

(56) References Cited

U.S. PATENT DOCUMENTS

| | | | | |
|---|---|---|---|---|
| 5,222,235 A * | 6/1993 | Hintz et al. | | 1/1 |
| 5,649,152 A * | 7/1997 | Ohran et al. | | 711/114 |
| 6,119,118 A * | 9/2000 | Kain et al. | | 707/822 |
| 6,125,377 A * | 9/2000 | Razin | | 715/234 |
| 7,158,999 B2 * | 1/2007 | Pace et al. | | 1/1 |
| 7,386,531 B2 * | 6/2008 | Kiessig et al. | | 1/1 |
| 7,386,532 B2 * | 6/2008 | Kiessig et al. | | 1/1 |
| 2003/0135478 A1 * | 7/2003 | Marshall et al. | | 707/1 |
| 2005/0187990 A1 * | 8/2005 | Pace et al. | | 707/204 |
| 2007/0088769 A1 * | 4/2007 | Pace et al. | | 707/204 |

OTHER PUBLICATIONS http://www.jaymoseley.com/hercules/cbtware/iehmap.htm <retrieved on Oct. 10, 2007> 2 pages.

* cited by examiner

*Primary Examiner* — Sheree Brown
(74) *Attorney, Agent, or Firm* — Cantor Colburn LLP; Elissa Wang

(57) ABSTRACT

A data processing method for a memory system of a computer includes: determining one or more volume locations of a file; determining one or more locations of extents of the file associated with each of the one or more volume locations; retrieving data attributes for each of the extents of the file at each of the one or more volume locations; formatting the data attributes; and generating an output including the formatted data attributes.

6 Claims, 4 Drawing Sheets

METHODS, SYSTEMS, AND COMPUTER PROGRAM PRODUCTS FOR VIEWING FILE INFORMATION

BACKGROUND

1. Field

This disclosure relates to methods, systems, and computer program products that collect and display non-contiguous data stored across multiple storage mediums.

2. Description of Background

A mainframe storage architecture commonly includes one or more disk volumes that store data. A volume table of contents (VTOC) is a data structure that resides on one or more of the disk volumes. The VTOC includes records known as data set control blocks (DCSB) that describe the data sets (files) on each of the disk volumes as well as size, location, and permissions of the files. The VTOC can reside anywhere on the disk volume. The first record on the first track of the first cylinder of any disk volume is traditionally called a volume label and includes a pointer to the location of the VTOC. The VTOC is added to the disk volume when the disk volume is initialized.

To locate a file on any particular disk volume, a program will generally interrogate a main catalog to find a location of the disk volume where the file resides. Having found the correct value, the VTOC is interrogated to find where on the disk the data is stored.

A file can be stored on one or more disk extents. An extent is a segment of storage on the disk device. The file can be stored across multiple disk volumes. Printing the extents per file is useful for development, testing, and customer problem diagnostics. Currently there exists no method for retrieving all multi-volume extents per file. At best, the conventional methods print only the extents per disk volume. To debug file issues using this printed data, a user would need to manually review the data for each disk volume. This method can be tedious and time consuming.

SUMMARY

The shortcomings of the prior art are overcome and additional advantages are provided through the provision of a method of retrieving data set control block information. The method includes: determining one or more volume locations of a file; determining one or more locations of extents of the file associated with each of the one or more volume locations; retrieving data attributes for each of the extents of the file at each of the one or more volume locations; formatting the data attributes; and generating an output including the formatted data attributes.

System and computer program products corresponding to the above-summarized methods are also described and claimed herein.

Additional features and advantages are realized through the techniques of the present invention. Other embodiments and aspects of the invention are described in detail herein and are considered a part of the claimed invention. For a better understanding of the invention with advantages and features, refer to the description and to the drawings.

TECHNICAL EFFECTS

As a result of the summarized invention, technically we have achieved a solution which allows a user to review file information in a contiguous form for a provided file.

BRIEF DESCRIPTION OF THE DRAWINGS

The subject matter which is regarded as the invention is particularly pointed out and distinctly claimed in the claims at the conclusion of the specification.

The foregoing and other objects, features, and advantages of the invention are apparent from the following detailed description taken in conjunction with the accompanying drawings in which.

The detailed description explains the preferred embodiments of the invention, together with advantages and features, by way of example with reference to the drawings.

DETAILED DESCRIPTION

Figure 1:
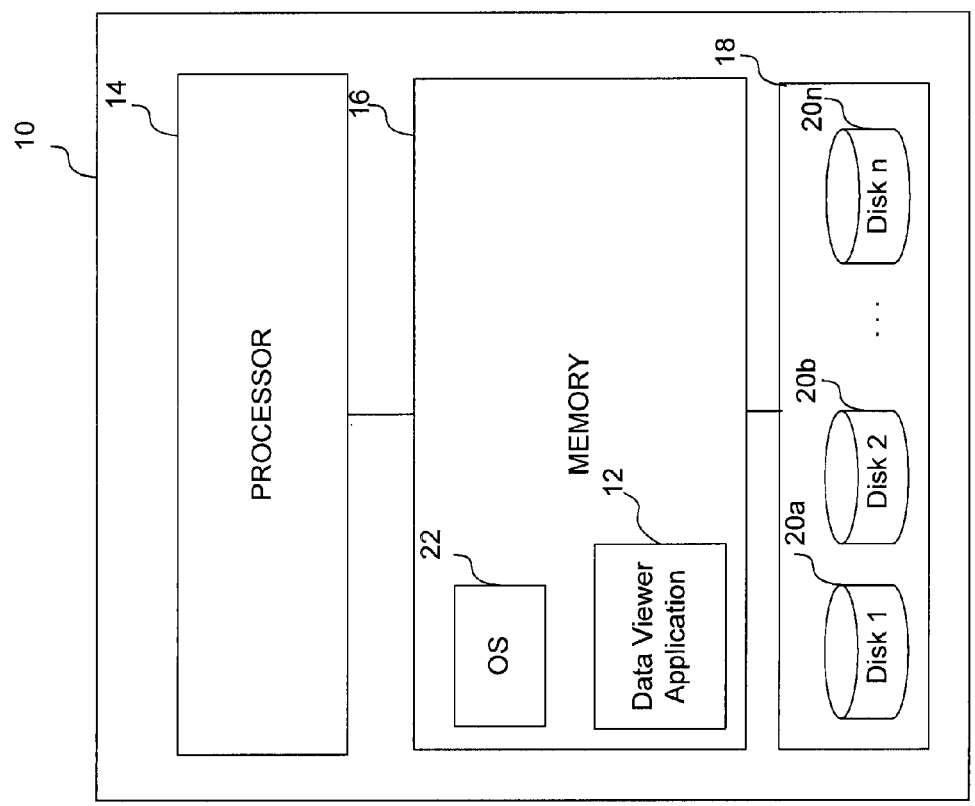
FIG. 1 is a block diagram illustrating a computing system that includes a data viewer application in accordance with an exemplary embodiment.

Turning now to the drawings in greater detail, it will be seen that in FIG. 1 a computing system 10 includes a data viewer application 12 in accordance with an exemplary embodiment. The computing system 10 is, for example, a mainframe that includes one or more processors 14 and one or more memory components 16, 18. The one or more processors 14 are configured to: execute instructions stored within the one or more memory components 16, 18; to communicate data to and from the one or more of the memory components 16, 18; and to generally control operations of the computing system 10 pursuant to the instructions. The processors 14 can be any custom-made or commercially available processor, a central processing unit, an auxiliary processor among several processors associated with the computing system 10, a semiconductor-based microprocessor, a macro processor, or generally any device for executing instructions.

As can be appreciated, the memory components 16, 18 can be at least one of Random Access Memory (RAM), Read Only Memory (ROM), a cash, a stack, or the like which may temporarily or permanently store electronic data of the computing system 10. In various embodiments, one or more of the memory components 18 includes a plurality of disk volumes 20a-20n for storing data associated with or generated by the instructions.

In various embodiments, at least one of the memory components 16 stores the instructions that can be executed by the one or more processors 14. The instructions stored in the memory component 16 may include one or more separate programs, each of which comprises an ordered listing of executable instructions for implementing logical functions. In the example of FIG. 1, the instructions stored in the memory component 16 include at least a suitable operating system (OS) 22 and the data viewer application 12 of the present disclosure. The OS 22 essentially controls the execution of other computer programs and provides scheduling input-output control, file and data management, memory management, and communication control of related devices.

As can be appreciated, in other embodiments, the data viewer application 12 of the present disclosure can be executed from a portable storage device (see e.g., CD-ROM, and diskette, flash drive, etc.) (not shown), and/or is run from a remote location, such as from a central server (not shown). The data viewer application 12, in general, retrieves, stores, and displays file information for single or multi-volume memory systems in a single execution.

Figure 2:
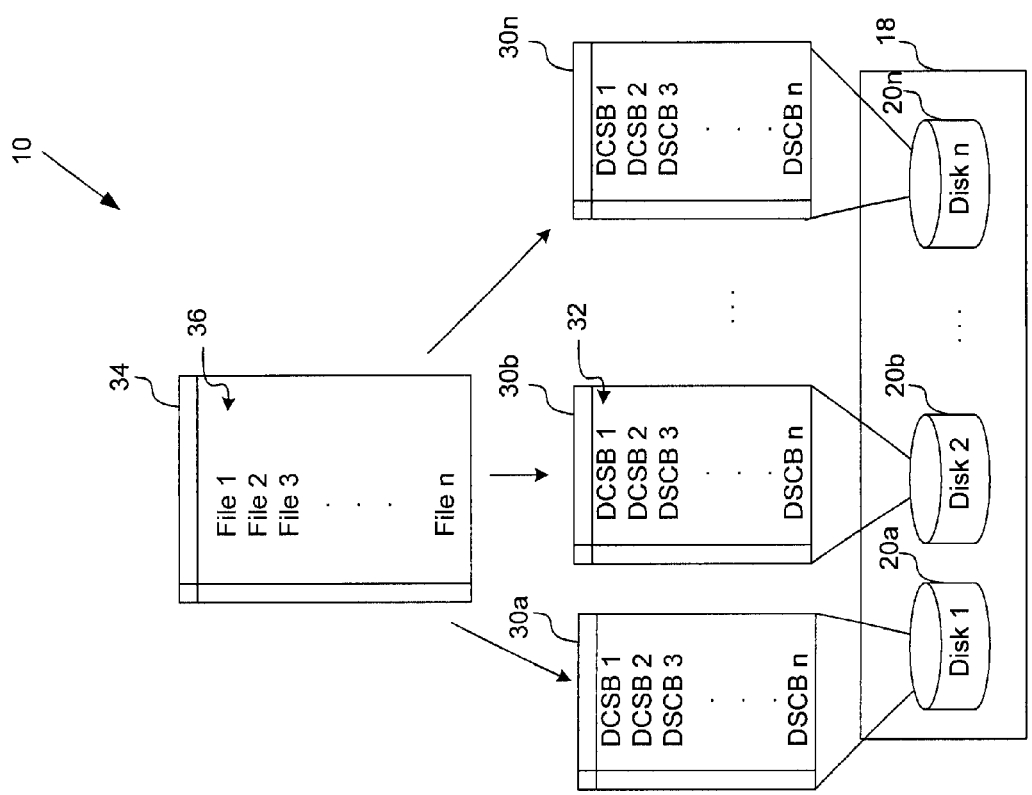
FIG. 2 is a block diagram illustrating data storage mediums of the computing system of FIG. 1 in accordance with an exemplary embodiment.

Turning now to FIG. 2, data structures and memory components of the computing system 10 are shown in accordance with an exemplary embodiment. As shown, each one of the one or more disk volumes 20a-20n includes a volume table of contents (VTOC) 30a-30n. Each volume table of contents 30a-30n includes data set control blocks (DSCB) 32 that indicate locations of or pointers to files that reside on the respective disk volume 20a-20n. In addition, the DSCBs 32 include attributes of the file extents. Such attributes can include, but are not limited to, volume location, creation dates, expiration dates, security data, and size.

A master catalog 34 is a data structure that resides on one of the disk volumes 20a-20n 18 (FIG. 1). The master catalog 34 includes a listing of all files and the disk volumes 20a-20n where the files reside. In various embodiments, the data viewer application 12 evaluates the master catalog 34 and/or one or more of the volume table of contents 30a-30n to collect the attributes for a selected file. The collected data can be interpreted, formatted, reported and/or saved. The formatted data is then used for diagnostic and debugging purposes (e.g. when a piece of a file is missing).

Figure 3:
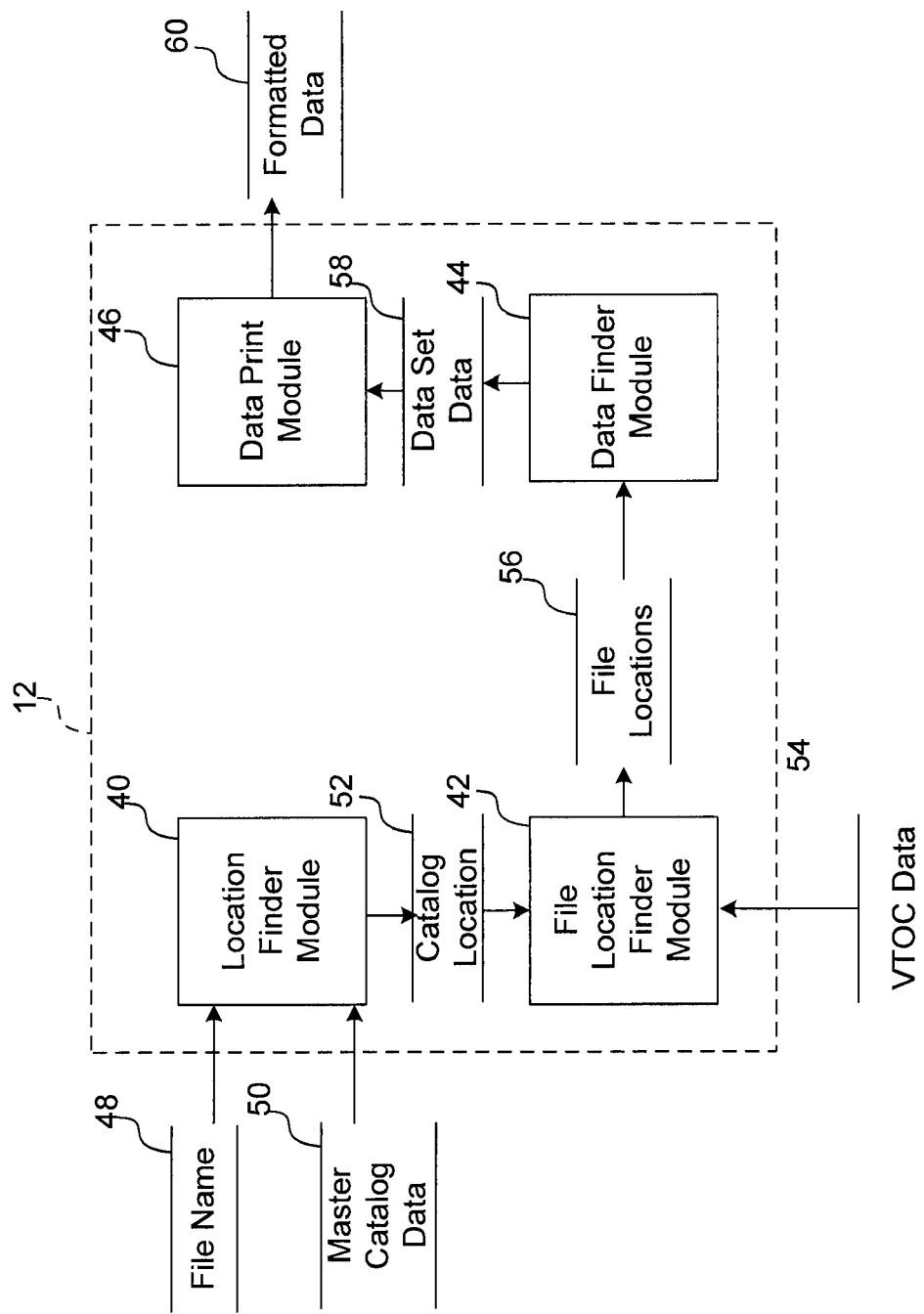
FIG. 3 is a dataflow diagram illustrating the data viewer application in accordance with an exemplary embodiment.

Turning now to FIG. 3, a data flow diagram illustrates the data viewer application 12 in accordance with an exemplary embodiment. The data viewer application 12 can include one or more modules. As can be appreciated, the modules can be implemented in software, hardware, firmware, and/or other suitable components that provide the describe functionality. As can be appreciated, the modules shown in FIG. 3 can be combined and/or further partition to similarly retrieve and report DSCB data. In this example, the data viewer application 12 includes a location finder module 40, a file location finder module 42, a data retriever module 44, and a data print module 46.

The location finder module 40 receives as input a file name 48 and master catalog data 50. In one example, the file name 48 is entered by a user via a parameter driven user interface. Based on the file name 48, the location finder module 40 determines a catalog location 52 by traversing the master catalog data 50. The catalog location 52 indicates on which disk volumes 20a-20n (FIG. 1) the file resides.

The file location finder module 42 receives as input the catalog location 52 and VTOC data 54. The file location finder module 42 determines the location within the disk volumes 20a-20n (FIG. 1) where the file resides. For example, portions of the file may reside on non-contiguous sectors of the disk volumes 20a-20n (FIG. 1). Based on the catalog location 52, the file location module 42 determines from the VTOC data 54 the file locations 56 on the disk volume 20a-20n that the file resides.

The data finder module 44 receives as input the file locations 56. The data finder module 44 chains through the file locations 56 and retrieves the DSCB data attributes 58 from each volume table of contents 30a-30n (FIG. 2) of the disk volumes 20a-20n (FIG. 2) on which the file resides.

The data print module 46 receives as input the DSCB data attributes 58. The data print module 46 interprets the attributes based on one or more interpretation rules that can be defined, for example, based on a format described by a technical guide. Based on the interpretation, the data print module 46 formats the data attributes in a readable form and stores the formatted data 60 to a file or prints the data to an output.

Figure 4:
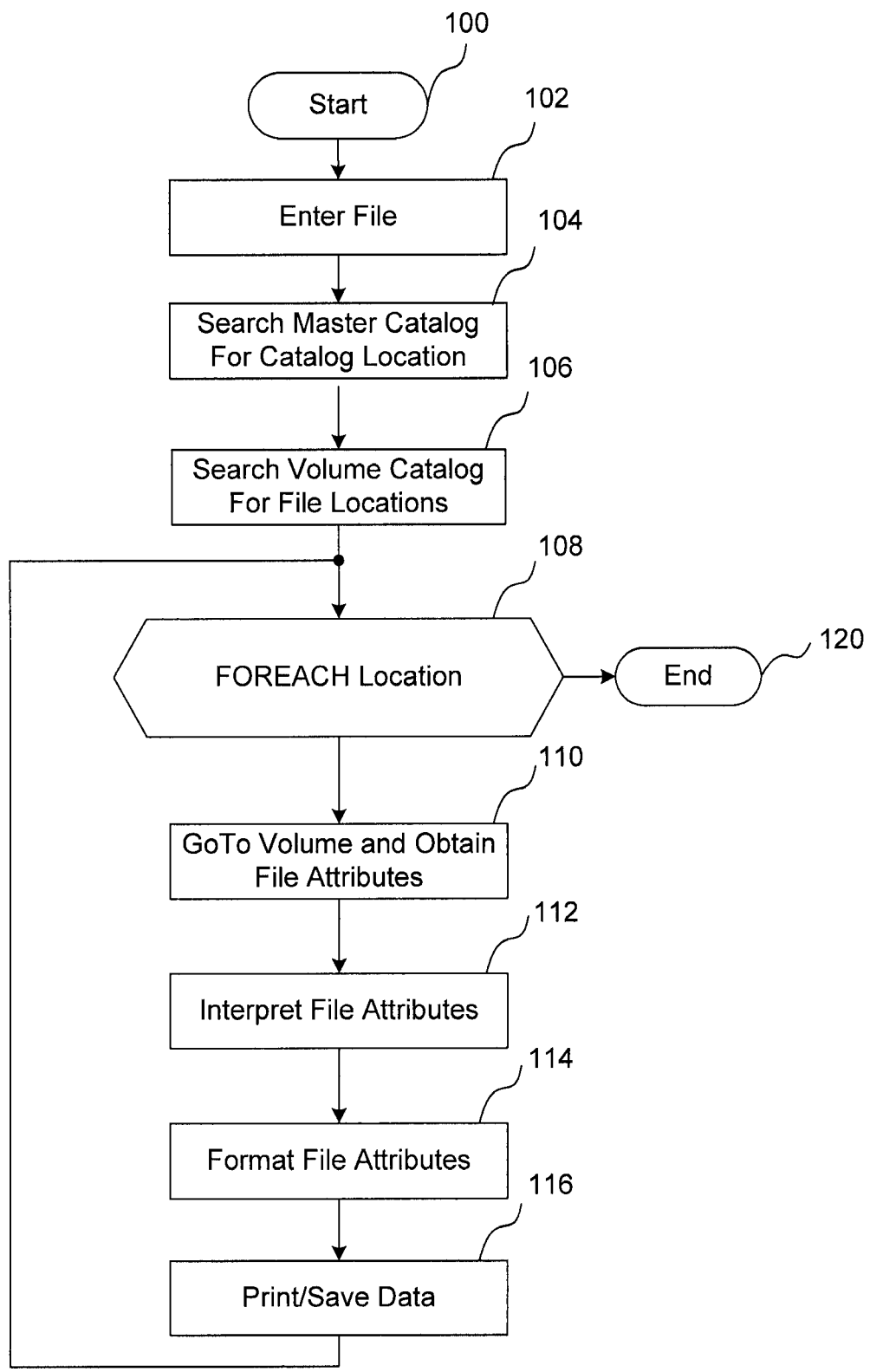
FIG. 4 is a flowchart illustrating a data viewer method that can be performed by the data viewer application in accordance with an exemplary embodiment.

Turning now to FIG. 4, a flowchart illustrates a data viewer method that can be performed by the data viewer application 12 of FIG. 3 in accordance with various aspects of the present disclosure. As can be appreciated in light of the disclosure, the order of operation within the method is not limited to the sequential execution as illustrated in FIG. 4, but may be performed in one or more varying orders as applicable and in accordance with the present disclosure.

In one example, the method may begin at 100. At block 102, a file name is entered. The master catalog is then searched and a catalog location is retrieved at block 104. The corresponding volume catalog is searched for file locations corresponding to the file name at block 106.

For each location at block 108, the corresponding data attributes are retrieved from the disk volume at 110. The file attributes are interpreted at block 112 and based on the interpretation of the file attributes, the file attributes are formatted at block 114. Thereafter, the formatted data attributes are saved or printed and/or both at block 116. Once each file location has been processed at block 108, the method it may end at 120.

As one example, one or more aspects of the present invention can be included in an article of manufacture (e.g., one or more computer program products) having, for instance, computer usable media. The media has embodied therein, for instance, computer readable program code means for providing and facilitating the capabilities of the present invention. The article of manufacture can be included as a part of a computer system or sold separately.

Additionally, at least one program storage device readable by a machine, tangibly embodying at least one program of instructions executable by the machine to perform the capabilities of the present invention can be provided.

The flow diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention.

While the preferred embodiment to the invention has been described, it will be understood that those skilled in the art, both now and in the future, may make various improvements and enhancements which fall within the scope of the claims which follow. These claims should be construed to maintain the proper protection for the invention first described.

What is claimed is:

1. A data processing method for a memory system of a computer, the method comprising:
   searching a master catalog to determine volume location information of a file, wherein the volume location information of the file comprises locations in two or more volumes of a plurality of volumes of the memory system;
   searching a respective table of contents for each of the two or more volumes in which the file is located to locate a plurality of extents of the file based on the file location information from the master catalog;
   retrieving data attributes for each of the extents of the file from the searched tables of contents;
   formatting the data attributes, the formatting comprising interpreting the data attributes using one or more interpretation rules, and converting the data attributes to a readable format based on the interpreting; and
   generating an output including the formatted data attributes.

2. The method of claim 1 wherein the master catalog is stored on one of one or more volumes.

3. The method of claim 1 wherein each volume table of contents is stored its respective volumes.

4. The method of claim 1 wherein the retrieving the data attributes further comprises retrieving the data attributes from data set control blocks of the at least one volume table of contents.

5. The method of claim 1 further comprising at least one of storing the output in a data file and printing the output.

6. The method of claim 1 wherein the file location information comprises non-contiguous sectors of the two or more volumes.

* * * * *